United States Patent
Crova et al.

(10) Patent No.: US 9,734,043 B2
(45) Date of Patent: Aug. 15, 2017

(54) TEST SELECTION

(71) Applicant: International Business Machines Corporation, Armonk, NY (US)

(72) Inventors: Gael C. Crova, Cherbourg-Octeville (FR); Guilhem J. Molines, Le Rouret (FR); Pierrick Perret, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/822,050

(22) Filed: Aug. 10, 2015

(65) Prior Publication Data

US 2016/0048444 A1 Feb. 18, 2016

(30) Foreign Application Priority Data

Aug. 12, 2014 (GB) .................................. 1414257.4

(51) Int. Cl.
*G06F 11/36* (2006.01)

(52) U.S. Cl.
CPC ...... *G06F 11/3676* (2013.01); *G06F 11/3672* (2013.01)

(58) Field of Classification Search
CPC .......................... G06F 11/3676; G06F 11/3672
USPC ........................................................ 717/124
See application file for complete search history.

(56) References Cited

U.S. PATENT DOCUMENTS

| 7,552,361 | B2 * | 6/2009 | Galler ................ G06F 11/3684 |
| | | | 714/38.1 |
| 8,239,835 | B2 | 8/2012 | Rex et al. |
| 9,244,818 | B1 * | 1/2016 | Paleja ..................... G06F 21/50 |
| 2008/0126867 | A1 * | 5/2008 | Pandarinathan .... G06F 11/3688 |
| | | | 714/37 |
| 2008/0183747 | A1 * | 7/2008 | Mangipudi ....... G06F 17/30557 |
| 2009/0150411 | A1 * | 6/2009 | Laaser ................... G06Q 10/10 |
| 2009/0265694 | A1 | 10/2009 | Bakowski |
| 2012/0030654 | A1 | 2/2012 | Park et al. |
| 2013/0091492 | A1 | 4/2013 | Mizrahi |
| 2013/0111267 | A1 | 5/2013 | Beryoza et al. |

FOREIGN PATENT DOCUMENTS

| EP | 1680741 B1 | 7/2006 |
| GB | 2460407 A | 2/2009 |

OTHER PUBLICATIONS

Yu et al.; "Oracle-Based Regression Test Selection"; IEEE; 2013 IEEE Sixth International Conference on Software Testing, Verification and Validation; © 2013 IEEE; pp. 292-301.

(Continued)

*Primary Examiner* — Viva Miller
(74) *Attorney, Agent, or Firm* — Edward J. Wixted, III

(57) ABSTRACT

In a method for selecting one or more tests for a compiled software module, a processor detects that one or more changes have been made to source code for a software module. A processor compiles the source code for the software module. A processor accesses a set of tests for the software module. A processor accesses metadata for each test of the set of tests. A processor receives a first set of one or more rules describing logical conditions relative to the metadata for the tests. A processor selects at least one test from the set of tests whose metadata corresponds to the received first set of one or more rules.

16 Claims, 6 Drawing Sheets

(56) References Cited

OTHER PUBLICATIONS

"A system to suggest regression test cases based on indirect change set and component references"; An IP.com Prior Art Database Technical Disclosure; IP.com No. 000227936; IP.com Electronic Publication: May 29, 2013; pp. 1-5.
"Continuous integration"; Wikipedia; last modified on May 15, 2015, at 20:37; Printed on: May 22, 2015; pp. 1-7; <http://en.wikipedia.org/wiki/Continuous_integration>.
"Rete algorithm"; Wikipedia; last modified on May 9, 2015, at 11:49; Printed on: May 22, 2015; pp. 1-10; <http://en.wikipedia.org/wiki/Rete_algorithm>.
"System and Method to Generate and Prioritize Test Cases"; An IP.com Prior Art Database Technical Disclosure; IP.com No. 000221075; IP.com Electronic Publication: Aug. 28, 2012; pp. 1-10.
GB Application No. 1414257.4; "Test Selection"; Filed on: Aug. 12, 2014; pp. 1-24.
Search Report for GB Application No. 1414257.4; Dated Feb. 9, 2015; pp. 1-4.

\* cited by examiner

TEST SELECTION

BACKGROUND

This invention relates generally to the field of selecting one or more tests for a compiled software module, and more particularly to strategizing automated software test coverage by leveraging a rule system.

In software development, in order to give development teams early feedback about the quality of the code being developed, teams are adopting continuous integration practices. These practices call for building authored software modules very frequently, often several times a day. Building a module means compiling it, but also executing a set of tests which are required to succeed in order to "accept" the module, that is, publish the compiled artifact to a central repository from where dependent modules can pull the module. When developing large applications, the volume of tests that are executed during the build of all modules can become significant.

A typical continuous integration environment consists of several elements including a source code management system, a build management system and a compiled artifact repository. The source code management system is used by developers to check code out, and commit their change set in. This keeps track of all versions of each file, as well as the identification of the developer associated with each change. Most source code management systems also include a notification mechanism, which can notify downstream systems that a change set was committed. At a minimum, a source code management system includes a way to query for change sets.

A build management system can be either centralized or distributed. In both cases, the build management system queries, or is notified by, the source code management system, in order to aggregate a list of the new change sets that have been committed since the time of the last build cycle. The build management system can then check out these changes to obtain a local copy of the source code which represents the latest version of the versioned source files and trigger a build cycle, which contains generally three sub-steps. The first sub-step is compilation of the various source files, from the source programming language(s) to machine executable code. This includes compilation of the test code. The second sub-step is execution of all or some tests on the compiled code, capturing the results of the tests (success or failure for each test). The third sub-step, based upon a success criteria, is publication of the compiled artifact to a central repository. The success criteria can be the success of all, or a fraction of the tests executed, depending on the team choice.

A compiled artifact repository is a system that hosts a series of versions of compiled source code, so that dependent modules can use the latest known good version of a compiled artifact they depend on, instead of having to compile it themselves.

SUMMARY

According to a first aspect of the present invention, there is provided a method of selecting one or more tests for a compiled software module, the method comprising the steps of detecting that one or more changes have been made to source code for a software module, compiling the source code for the specific software module, accessing a set of tests for the specific software module, accessing metadata for each test of the set of tests, receiving one or more rules describing logical conditions relative to the metadata for the tests, and selecting those tests from the set of tests whose metadata matches the received rules.

According to a second aspect of the present invention, there is provided a system for selecting one or more tests for a compiled software module, the system comprising a processor arranged to detect that one or more changes have been made to source code for a software module, compile the source code for the specific software module, access a set of tests for the specific software module, access metadata for each test of the set of tests, receive one or more rules describing logical conditions relative to the metadata for the tests, and select those tests from the set of tests whose metadata matches the received rules.

According to a third aspect of the present invention, there is provided a computer program product on a computer readable medium for selecting one or more tests for a compiled software module, the computer program product comprising instructions for detecting that one or more changes have been made to source code for a software module, compiling the source code for the specific software module, accessing a set of tests for the specific software module, accessing metadata for each test of the set of tests, receiving one or more rules describing logical conditions relative to the metadata for the tests, and selecting those tests from the set of tests whose metadata matches the received rules.

DETAILED DESCRIPTION

Figure 1:
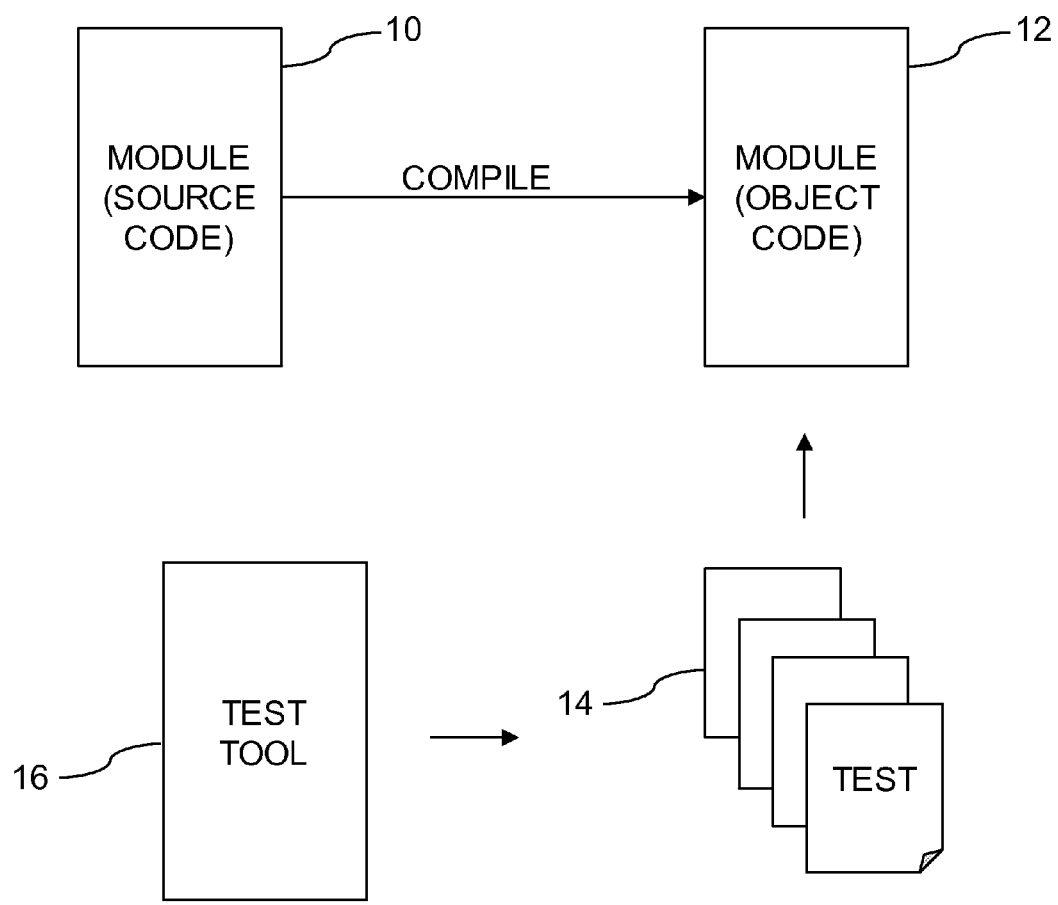
FIG. 1 is a schematic diagram of a software development environment, in accordance with an embodiment of the present invention.

In a development team applying the principles of continuous integration, it is very important that the build cycles are frequent, that is, each module is built several times a day. This give the developers early feedback on regressions they may have mistakenly introduced by a code change. This also maintains the team in the good habit of aiming for an always successful build. Priority is given to repair the build when it happens to be broken, instead of postponing this task to a later date, which generally ends up being more difficult and error-prone. Consequently, the speed at which the overall build system can build the various components is of paramount importance. As the application gets larger and developers write more tests (which is a good practice and a key to good testing coverage) the amount of time and resources it takes to execute these tests as part of the build cycle becomes more and more significant, thus hindering the ability for the system to provide a quick turnaround time.

Thus the question arises of deciding which subset of the tests actually need be executed. Indeed, as the builds are performed frequently, the list of change sets that occurred between two builds is relatively limited. Consequently, not a lot of code has changed between two builds. It would then be more efficient to run only the subset of the tests that may be affected by those changes. The key is then to be able to determine which of the tests may be impacted depending on where the code changes occurred. Yet, in large software suites developed by hundreds of people, the impacted tests are still too large to be run continuously. In general, impact tables are not totally reliable, thus requiring some other tests to be executed to detect regressions as early as possible. Also, quality assurance teams have to strategize the running of test suites, giving priority to certain areas of the software products, while possibly relaxing other areas. Finally, eventually all tests must be run. Therefore it is important to ensure their execution from time to time.

Owing to the invention, it is possible to provide an effective method of selecting tests to run against compiled modules which will test the correct amended source code in a manner that can be easily controlled using expressible rules. Embodiments of the present invention address the domain of software quality assurance. In this area, large suites of automated test programs are continuously run to attempt to detect defects and regressions. Embodiments of the present invention provide a methodology to prioritize and rationalize the tests to be run, achieving the best compromise between coverage and resources spent to ensure this coverage.

In a development team applying the principles of continuous integration, it is very important that the build cycles are frequent, that is, each module is built several times a day. Because of the frequency of the build, only a fraction of the code base will have been changed since the previous build. Consequently, it may not be necessary to re-execute all the tests, but only a subset of them. The method and system described herein provide a method of computing the right subset of tests to select. The purpose of the improved system is to compute precisely this subset, using a method defined hereafter, and preferably combining code coverage data with the application of business rules. Embodiments of the present invention support a method to provide a quality assurance manager with means to define elaborate strategies of test selection, which enable introducing contextual information in the decision to run the tests or to defer their execution to a more appropriate time. This method is exercised periodically, each time significant changes in the source code being tested are made.

An embodiment of the method consists of providing means of expressing preconditions to run a given tests in the form of rules. These rules involve a variety of conditions on the test and the context in which it is being run. Then an automated tool will be run to perform a selection of the tests to be run leveraging the rules described by the user. Then the tests are run, and specific data on the execution of the tests is stored for the later contextual invocation of the tool.

FIG. 1 illustrates schematically a module 10 in source code that can be compiled into a module 12 in object code. This compiling of the module 10 occurs as part of a build of one or more modules 10 that will occur regularly during a software development process. Changes may be made daily to modules 10 during the development process and there may be corresponding multiple daily builds taking place. A module 12 that has been compiled will then need to be tested using a set of tests 14 to ensure that the changes to the module 12 have not created one or more bugs in the final module 12. A module 10 can have a million lines of source code, with only a few lines being changed at any one time.

An automated test tool 16 is used for scheduling the tests 14 to be used. Running automated test tool 16 preferably starts by retrieving all of the tests 14, which are usually stored alongside the source code 10. Previous execution times and results of the tests 14 may be retrieved from a database along with a list of changes, usually called commits, since a chosen period of time which can be the last time the software was built or a given past date. If the commit is a new test, then it is added to the database, and flagged as new.

A test coverage data table may be retrieved. For each test 14, the test coverage data table contains a list of impacted entry points and is stored as a dual entry matrix or a tree, allowing the fast finding of the entry points covered by a given test, or, vice-versa, retrieving the tests that cover a given entry point. Using a rule based system (preferably implementing a RETE like algorithm an operating algorithm will assert the test descriptors, the entry points in the list of commits, and an empty set of tests to be executed and will trigger the rule system, which will have the effect of filling the tests (e.g., tests 14) to be executed. The process will complete by running these selected tests using the standard test running suite, collecting updated coverage data in the process and storing the results of the tests in the database for later reuse.

Figure 2:
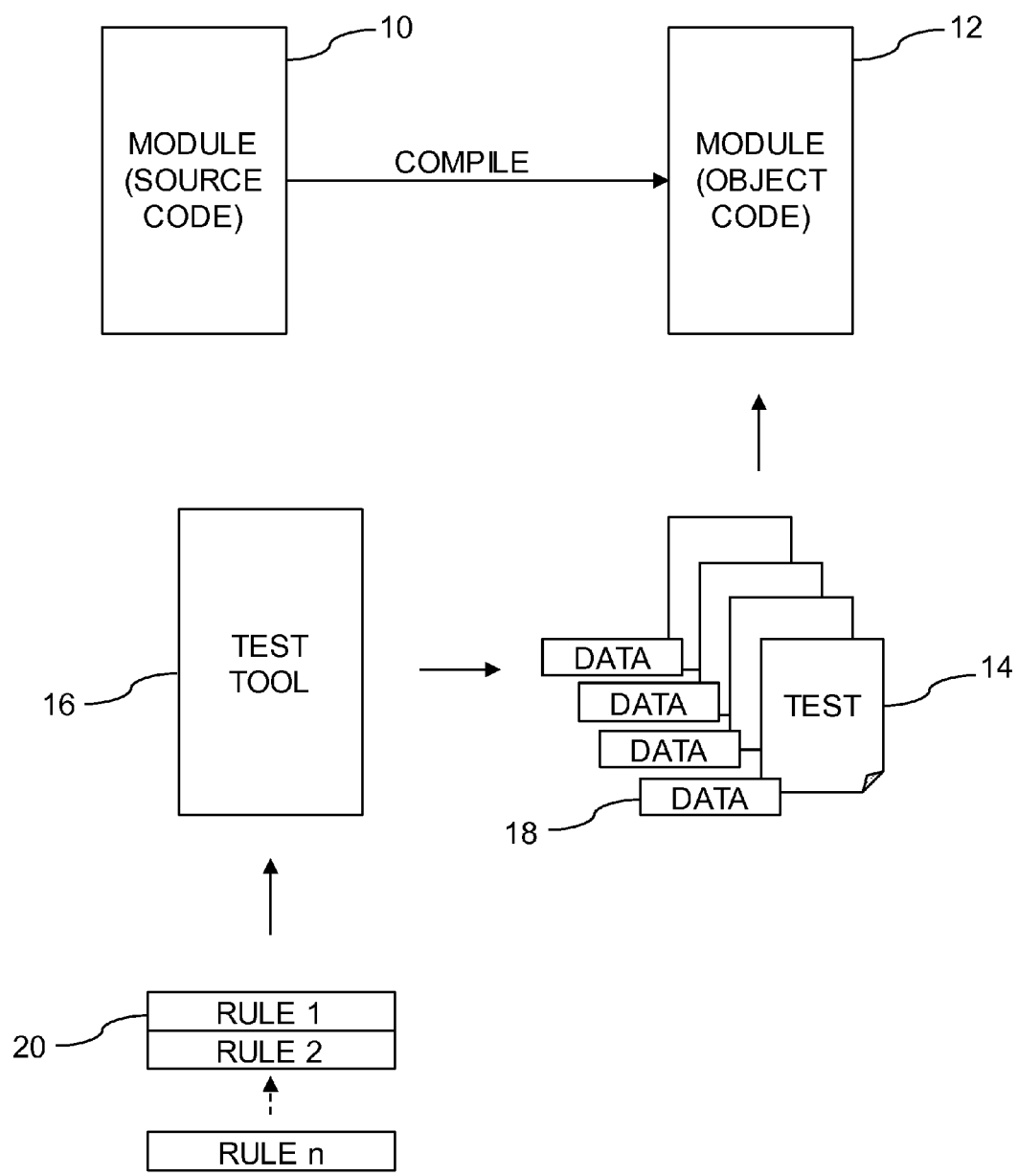
FIG. 2 is a further schematic diagram of the software development environment, in accordance with an embodiment of the present invention.

Once it has been detected that one or more changes have been made to source code for a module 10 and the source code for the specific module 10 has been compiled, then there is accessed a set of tests 14 for the specific module 10. These tests 14 are then further filtered by tool 16, as illustrated in FIG. 2, which is accessing metadata 18 for each test 14 of the set of tests 14, receiving one or more rules 20 describing logical conditions relative to the metadata 18 for the tests 14, and selecting those tests 14 from the set of tests 14 whose metadata 18 matches the received rules 20.

Embodiments of the present invention system supports the use of natural language rules. In one example, it is possible to describing the coverage strategy in the form of the following rules: if the test suite is tagged "DB2 access" then schedule test; if the test suite is tagged "DB2access" and no other test in the current selection is already tagged "DB2 access" then increase its selection priority; if today is Sunday then schedule test; if the test suite has not been executed for a week, then schedule test; if the last execution of the test was failed, then schedule test; if the entry point is in the list of the impacted entry points of the test then schedule test; set e to an entry point in the list of the last commits; set t to a test; if the list of impacted entry points of the test contains e, then schedule t; and if the test is new then schedule test.

The rules listed above are simply examples of rules 20 that can be generated by quality assurance managers as natural language that can then be used as inputs to the test tool 16. Test tool 16 will select the tests 14 to be used against the compiled module 12, according to the how the rules 20 relate to the metadata 18 for the individual tests 14.

As can be seen in the above list of example rules that refer to entry points, test coverage data can be referenced by rules. When tests (e.g., tests 14) are executed as part of a standard test suite execution process, it is possible to use a version of the code (both tests and tested code) that has been previously instrumented in such a way that it can capture, at execution time, the actual call graph traversed throughout the code from the entry points. This information is typically represented as a series of call trees, where the root is an entry point, and the children are the hierarchy of function calls. A rule therefore describes a logical condition in respect of the impacted entry points and the detected changes to the respective module source code.

Figure 3:
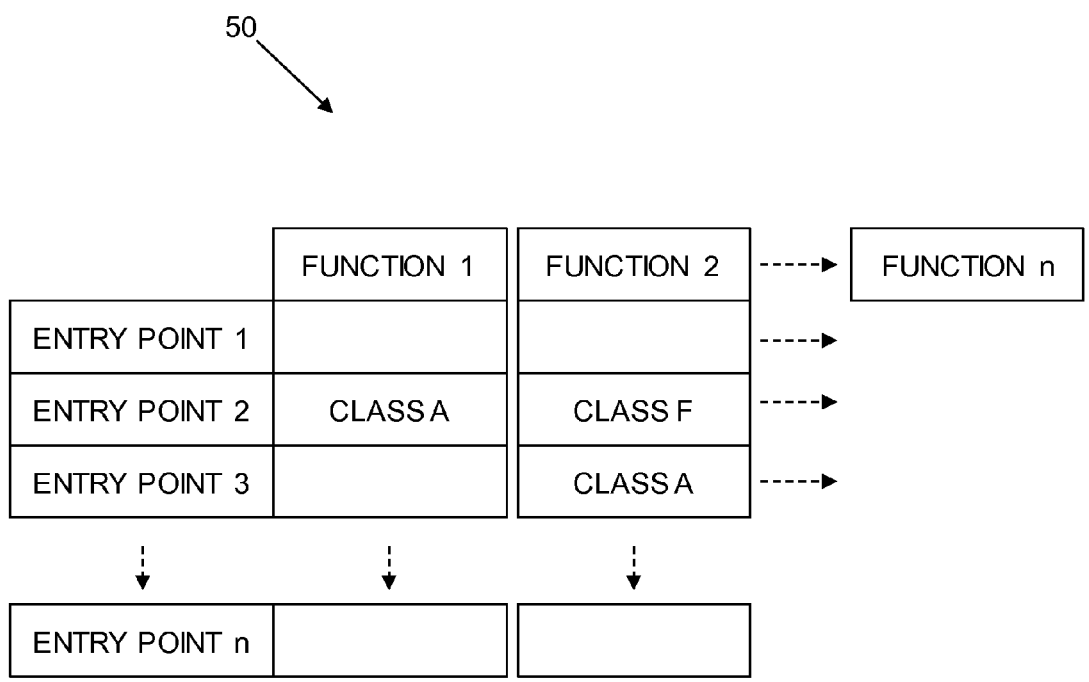
FIG. 3 is a matrix of test coverage data, in accordance with an embodiment of the present invention.

Preferably, it is more efficient to store this information in the form of a matrix 50 shown in FIG. 3, thus flattening the tree. Each row of the matrix represents an entry point. Each column represents a function and each cell can then denote if the function represented by the column is called (directly or transitively) by the entry point represented by this row. For each function (i.e., column of the matrix), it is also possible to store the code location where it is found (typically a class or a file). This is so that the function can be tied back to the change set revision.

This data structure, which can also be referred to as an impact table, allows knowledge of the extensive list of all the functions that are called from an entry point, by simply scanning the matching row. Equally, the impact table can also easily be read by column, to obtain a list of all entry points that have somehow resulted in the invocation of the function represented by that column.

A list of commits is used in the process. Upon each execution of the method by a continuous integration system, the revision of the most recent change set used for this execution is recorded. This is so that the continuous integration system can then compute the list of all change set revisions that have occurred in the source code control system since the last time the build plan was triggered. The source code control system is offering a service which allows the list of the change sets that are matching a specific revision to be obtained, so by querying it, it is possible to obtain the list of all change sets which need to be considered for this test execution as having a potential impact, and thus need be fed in the approach described above for analysis.

It is also desirable to maintain a database of past executions of the tests. This database records the status of past executions, and contains a list of tests designation. For each test, the database stores a potential status of "new" (which is set when the test has never been executed before), or the result of the execution of the test (passed or failed), as well as its last execution date. This information can be considered as part of the metadata for individual tests and can be queried by the natural language rules that are written to determine which of the tests will be run against a changed module.

Figure 4:
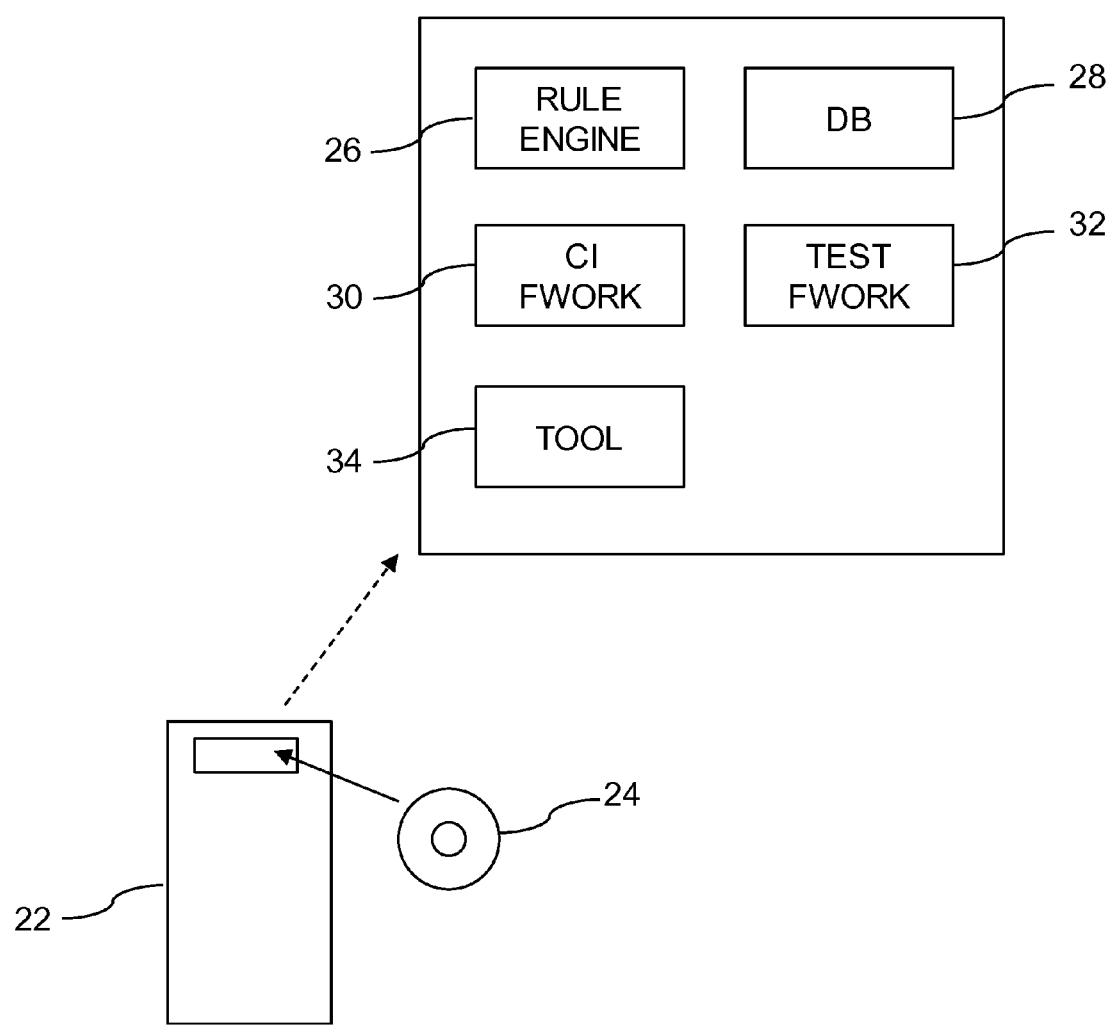
FIG. 4 is a schematic diagram of a server and execution environment, in accordance with an embodiment of the present invention.

To implement the method of selecting the tests, FIG. 4 illustrates a preferred embodiment of the software elements, as executed by a processor on server 22 under the control of a computer program product on computer readable medium 24. Server 22 also runs rule engine 26, preferably with a RETE engine, which will be used to evaluate the test subset to be executed according to the embodied strategy.

Also present is database 28, used to store the past executions. Database 28 can also store the test coverage data, or this can be stored separately in a different structure (such as on a file system). Continuous integration framework 30, such as Atlassian® Bamboo®, test framework 32 to execute test suites, such as the JUnit test framework if running in Java®, or similar, depending on the language, and tool 34 for instrumenting code in such a way that coverage data can be captured, such as Atlassian® Clover®, are also present.

Figure 5:
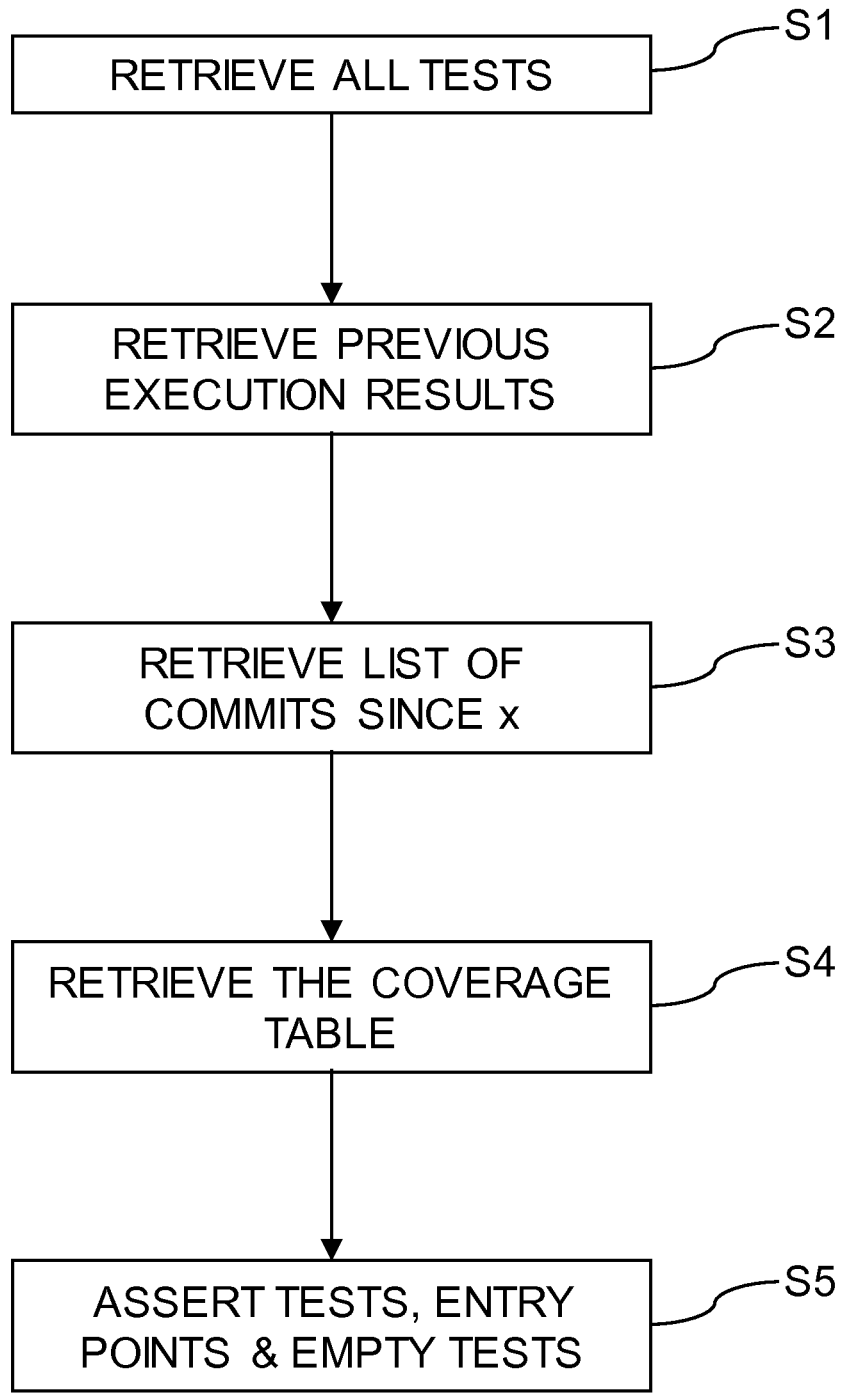
FIG. 5 is a flowchart of a method for selecting tests, in accordance with an embodiment of the present invention.
Figure 6:
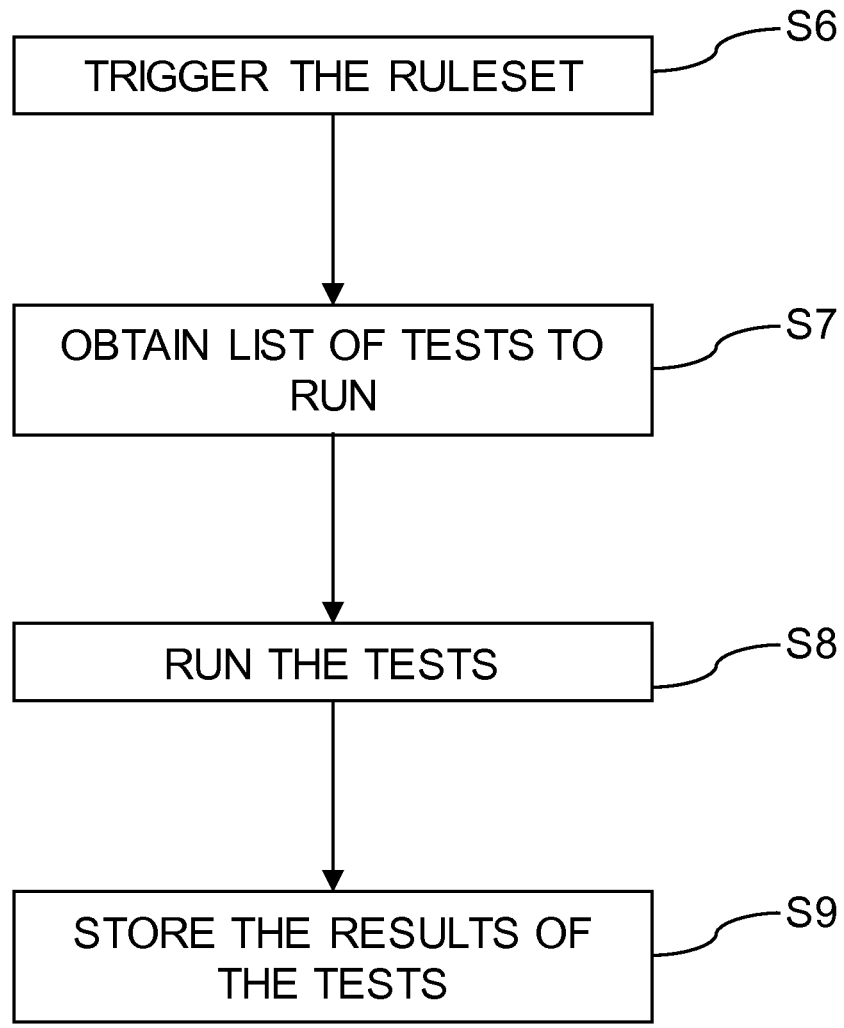
FIG. 6 is a further flowchart of a method of selecting tests, in accordance with an embodiment of the present invention.

FIGS. 5 and 6 illustrate the preferred embodiment of the method of selecting tests for use against software modules. Before the rule engine is invoked, at step S1, all tests are retrieved. This is performed by querying the database of past executions and gathering the list of tests under the form on an in-memory representation of the database records. At step S2 previous execution times and results are retrieved. This is also performed by querying the database of past executions, for each of the tests retried by the previous tests. These execution times and results are also stored in a memory structure that will be suitable for the rule engine to consume.

At step S3, the list of commits is retrieved. This will be since a specific point such as the last build, since a given date or since the last version. The time from which to retrieve the list of commits, designated by "x" in FIG. 5, is a configuration parameter chosen by the user. It is recommended to use "since the last build" for usage in a continuous integration framework, but the "since a given date" is an alternative for scheduled executions. The list of commits is retrieved by querying the source code control system, which offers the feature as a service. In some source code control systems, it is possible to address the list of commits through a specific change set revisions, while in some others, it is only possible to query between specific time stamps. In the latter case, should the user wish to query "since the last build," then the user will need to use the time and date of the last build to do so, obtained from the continuous integration system. For each commit, it is necessary to check that the list of files is the associate change sets. For all of the files which are concerning new tests (e.g., not found in the list of tests retrieved in the first step), there is created a record in the database (e.g., database 28) of past executions for this test which is marked as "new".

At step S4 the coverage table is retrieved. The system retrieves the coverage table, which can be stored in the same database as past executions, or separately, for example in a file system. A coverage table defines entry points within the respective module impacted by the test. For each test a list of impacted entry points is produced. For each test retrieved in step 1, or discovered in the list of commits, the system looks up in the coverage table the matching row and fetches the list of impacted entry points. Note, for a new test, the row will not exist in the coverage table. This is not an issue as these tests will be scheduled for execution, and thus their coverage data will be built by that first execution.

At step S5, the tests, the entry points in the list of commits, and an empty set of tests to be executed are asserted. The list of tests retrieved at the first step, the entry points retrieved at the previous steps form input parameters that are fed to the rule engine. An empty set of tests to be executed is also passed as an output parameter to the rule engine. Note: this assumes that there is written a rule such as "if the test is new schedule it". Alternatively, the system can omit the writing of this rule, and pre-populate the set of tests to be executed with the list of new tests. The rule engine will only add to this set.

Referring to FIG. 6, at step S6, the ruleset is triggered. This is simply to kick off the execution of the rule engine, with the aforementioned parameters and the ruleset describing the strategy. At step S7, the list of tests to run is obtained by reading the output parameter that the execution of the rule engine has filled, and at step S8, the tests are run. This step is no different than what is usually done in a continuous integration system, except that the list of tests to be executed is restricted to those tests that have been computed by the rule engine. Note that the execution of the tests is performed using coverage instrumentation in order to re-compute the coverage data, since that data changes as the call graph changes in-between several builds, due to code changes, and also to capture the coverage data for new tests. A step S9 the results of the tests are stored. This final step consists of gathering the test execution results in terms of failure or success for each test, and updating the database of past executions accordingly.

Embodiments of the invention provides a method for performing automated software tests which includes the step of selecting which tests are to be run according to user-defined policies, where the policies are described according to a set of rules which include logical conditions over the test metadata, and the description of the changes having occurred to the source code that should have the test be triggered or not. The metadata can comprise one or more user-defined properties which are not derivable from the test data itself and related rules will therefore describe a logical condition in respect of a user-defined property.

Preferable features of embodiments of the invention include creating a coverage table and asserting it to create rules that refer to the dependencies of the tests and changes occurring to the software, tagging tests with module names or other user-chosen properties so they can be used in the rule descriptions, asserting metadata on the context of execution, for example, that today is Monday, and using a RETE engine as an inference mechanism to execute the ruleset. Rules can describe execution context for the tests, and tests are therefore selected that match the execution context. A rule inference engine, preferably implemented with a RETE algorithm can be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of selecting one or more tests for a compiled software module, the method comprising the steps of:
   detecting, by one or more processors, that one or more changes have been made to source code for a software module;
   compiling, by one or more processors, the source code for the software module;
   accessing, by one or more processors, a set of tests for the software module;
   accessing, by one or more processors, metadata for each test of the set of tests;
   receiving a first set of one or more rules describing logical conditions relative to the metadata for the tests; and
   selecting at least one test from the set of tests whose metadata corresponds to the received first set of one or more rules.

2. The method of claim 1, wherein:
   the metadata for each test comprises one or more user-defined properties, not derivable from test data; and
   at least a rule of the received first set of one or more rules describes a logical condition in respect of a user-defined property of the one or more user-defined properties.

3. The method of claim 1, further comprising:
   receiving a second set of one or more rules describing execution context for the set of tests; and
   wherein, selecting the at least one test from the set of tests further comprises selecting the at least one test from the set of tests whose metadata corresponds to the received second set of one or more rules.

4. The method of claim 1, wherein the step of selecting the at least one test from the set of tests whose metadata corresponds to the received first set of one or more rules is performed using a rule inference engine.

5. The method of claim 4, wherein the rule inference engine is implemented with a RETE algorithm.

6. A computer system for selecting one or more tests for a compiled software module, the computer system comprising:
   one or more computer processors, one or more computer-readable storage media, and program instructions stored on the computer readable storage media for execution by at least one of the one or more processors, the program instructions comprising:
   program instructions to detect that one or more changes have been made to source code for a software module;
   program instructions to compile the source code for the software module;
   program instructions to access a set of tests for the software module;
   program instructions to access metadata for each test of the set of tests;
   program instructions to receive a first set of one or more rules describing logical conditions relative to the metadata for the tests; and
   program instructions to select at least one test from the set of tests whose metadata corresponds to the received first set of one or more rules.

7. The computer system of claim 6, wherein:
   the metadata for a test comprises one or more user-defined properties, not derivable from test data; and
   at least one a rule of the received first set of one or more rules describes a logical condition in respect of a user-defined property of the one or more user-defined properties.

8. The computer system of claim 6, further comprising:
   program instructions, stored on the one or more computer readable storage media for execution by at least one of the one or more processors, to receive a second set of one or more rules describing execution context for the set of tests; and
   wherein program instructions to select the at least one test from the set of tests further comprises program instructions to select the at least one test from the set of tests whose metadata corresponds to the received second set of one or more rules.

9. The computer system of claim 6, wherein the program instructions to select the at least one test from the set of tests whose metadata corresponds to the received first set of one or more rules are performed using a rule inference engine.

10. The computer system of claim 9, wherein the rule inference engine is implemented with a RETE algorithm.

11. A computer program product for selecting one or more tests for a compiled software module, the computer program product comprising:
   one or more computer readable storage media and program instructions stored on the one or more computer readable storage media, the program instructions comprising:
   program instructions to detect that one or more changes have been made to source code for a software module;
   program instructions to compile the source code for the software module;
   program instructions to access a set of tests for the software module;
   program instructions to access metadata for each test of the set of tests, wherein the metadata for each test of the set of tests comprises a coverage table defining entry points within the software module impacted by the respective test;
   program instructions to receive a first set of one or more rules describing logical conditions relative to the metadata for the tests, wherein at least a rule of the received first set of one or more rules describes a logical condition to identify entry points of respective coverage tables corresponding to the detected one or more changes to the source code; and
   program instructions to select at least one test from the set of tests whose metadata corresponds to the received first set of one or more rules.

12. The computer program product of claim 11, wherein:
   the metadata for each test further comprises one or more user-defined properties, not derivable from test data; and at least a rule of the received first set of one or more rules describes a logical condition in respect of a user-defined property of the one or more user-defined properties.

13. The computer program product of claim 11, further comprising:
   program instructions, stored on the one or more computer readable storage media, to receive a second set of one or more rules describing execution context for the set of tests; and
   wherein program instructions to select the at least one test from the set of tests further comprise program instructions to select the at least one test from the set of tests whose metadata corresponds to the received second set of one or more rules.

14. The computer program product of claim 11, wherein the program instructions to select the at least one test from the set of tests whose metadata corresponds to the received first set of one or more rules are performed using a rule inference engine.

15. The computer program product of claim 14, wherein the rule inference engine is implemented with a RETE algorithm.

16. The computer program product of claim 1, wherein the coverage table is a matrix, wherein:
   each row of the matrix represents an entry point;
   each column of the matrix represents a function; and
   each cell represents whether the function of the corresponding column is called by the entry point of the corresponding row.

* * * * *